United States Patent
Hatanaka (10) Patent No.: US 8,231,789 B2
(45) Date of Patent: Jul. 31, 2012

(54) CROSS-FLOW FILTRATION METHOD AND CROSS-FLOW FILTRATION DEVICE

(75) Inventor: Yusuke Hatanaka, Haibara-gun (JP)

(73) Assignee: FUJIFILM Corporation, Tokyo (JP)

(*) Notice: Subject to any disclaimer, the term of this patent is extended or adjusted under 35 U.S.C. 154(b) by 191 days.

(21) Appl. No.: 12/195,872

(22) Filed: Aug. 21, 2008

(65) Prior Publication Data

US 2009/0050564 A1 Feb. 26, 2009

(30) Foreign Application Priority Data

Aug. 24, 2007 (JP) ................. 2007-218209

(51) Int. Cl.
- B01D 61/00 (2006.01)
- B01D 39/14 (2006.01)
- C25D 11/12 (2006.01)

(52) U.S. Cl. ............... 210/653; 210/650; 210/500.25; 205/175; 205/324

(58) Field of Classification Search ............ 210/498, 210/500.21, 500.25, 650, 652, 653; 205/172, 205/175, 324, 325
See application file for complete search history.

(56) References Cited

U.S. PATENT DOCUMENTS

| | | | |
|---|---|---|---|
| 5,342,517 A * | 8/1994 | Kopf | 210/228 |
| 5,693,210 A | 12/1997 | Tomita et al. | |
| 7,732,015 B2 * | 6/2010 | Nomura et al. | 427/277 |
| 7,838,105 B2 * | 11/2010 | Hatanaka et al. | 428/304.4 |
| 2005/0284814 A1 * | 12/2005 | Mairal et al. | 210/644 |
| 2007/0151850 A1 * | 7/2007 | Wang et al. | 204/424 |
| 2007/0224235 A1 * | 9/2007 | Tenney et al. | 424/423 |
| 2008/0152941 A1 * | 6/2008 | Hatanaka et al. | 428/613 |

FOREIGN PATENT DOCUMENTS

| | | |
|---|---|---|
| EP | 0 121 785 A2 | 10/1984 |
| EP | 1 900 855 A2 | 3/2008 |
| JP | 59-209612 A | 11/1984 |
| JP | 62-129106 A | 6/1987 |
| JP | 04-145929 A | 5/1992 |
| JP | 4-190834 A | 7/1992 |
| JP | 4-190835 A | 7/1992 |
| JP | 2000-299095 A | 10/2000 |
| WO | 2005/039743 A2 | 5/2005 |

OTHER PUBLICATIONS

Lee et al., Fast fabrication of long-range ordered porous alumina membranes by hard anodization, Aug. 20, 2006, Nature Publishing Group, vol. 5, Sep. 2006, pp. 741-747.*

(Continued)

*Primary Examiner* — Tony G Soohoo
*Assistant Examiner* — David C Mellon
(74) *Attorney, Agent, or Firm* — Sughrue Mion, PLLC (57) ABSTRACT

A method of cross-flow filtration using a membrane filter has a feeding a fluid to be filtered across a membrane surface of a porous alumina membrane filter serving as the membrane filter so that the fluid flows parallel to the membrane surface to separate material to be filtered with the porous alumina membrane filter. The porous alumina membrane filter is made of an aluminum anodized film and includes micropores having a degree of ordering as defined by formula (1):

Degree of ordering (%)=$B/A \times 100$     (1)

of at least 50%, a porosity as defined by formula (2):

Porosity (%)=$C/D \times 100$     (2)

of at least 40%, and a percentage of a pore size standard deviation to an average pore size of up to 10%.

1 Claim, 3 Drawing Sheets

OTHER PUBLICATIONS

Masuka, Hideki, "Functional Applications of Alumina Nanohole Arrays Based on Self-Ordering Process", 2003, Oyo Buturi, vol. 72, No. 10, p. 1280-1285.*

English language translation of "Functional Applications of Alumina Nanohole Arrays Based on Self-Ordering Process", pp. 1-3.*

Hideki Masuda, et al, "Control of Nanohole Shapes of Anodic Porous Alumina and its Applications", Journal of the Surface Science Society of Japan, 2004, p. 260-264, vol. 25, No. 5.

Yoshitaka Matsui, et al, "Formation of Alumina Nanohole Array Ordered Hole Arrangement Based on Texturing Treatment", Kanagawa Academy of Science and Technology Summary of Researches 2005-2006, 20 Pages.

EP Communication, dated Dec. 16, 2008, issued in corresponding European Application No. 08014841.4, 10 pages.

N. Itoh et al., "Preparation of a tubular anodic aluminum oxide membrane," Journal of Membrane Science, vol. 117, No. 1, Aug. 21, 1996, pp. 189-196.

N. Itoh et al., "Strengthened porous alumina membrane tube prepared by means of internal anodic oxidation," Microporous and Mesoporous Materials, vol. 20, No. 4-6, Mar. 1, 2008, pp. 333-337.

K. Itaya et al., "Properties of Porous Anodic Aluminum Oxide Films as Membranes," Journal of Chemical Engineering of Japan, vol. 17, No. 5, 1984, pp. 514-520, XP-002507121.

R. C. Furneaux et al., "The formation of controlled-porosity membranes from anodically oxidized aluminium," Nature, vol. 337, No. 6203, Jan. 12, 1989, pp. 147-149, XP-002121054.

P. Mardilovich et al., "New and modified anodic alumina membranes Part I. Thermotreatment of anodic alumina membranes," Journal of Membrane Science, vol. 98, No. 1, Jan. 13, 1995, pp. 131-142.

H. Jones, "Inorganic membrane filter for analytical separations," International Laboratory, vol. 19, No. 7, Sep. 1, 1989, pp. 30-32, XP-000084520.

Hideki Masuda et al., "Fabrication of Gold Nanodot Array Using Anodic Porous Alumina as an Evaporation Mask", Jpn. J. Appl. Phys. vol. 35 (1996) pp. L 126-L 129, Part 2, No. 1B, Jan. 15, 1996.

Office Action issued in corresponding Japanese Patent Application No. 2007-218209 on Apr. 26, 2011, with partial English language translation.

* cited by examiner

CROSS-FLOW FILTRATION METHOD AND CROSS-FLOW FILTRATION DEVICE

The entire contents of all documents cited in this specification are incorporated herein by reference.

BACKGROUND OF THE INVENTION

The present invention relates to a cross-flow filtration method and a cross-flow filtration device.

In recent years, microfiltration and ultrafiltration technologies are increasingly applied to various fields such as protein adsorbents, water purification, air cleaning, structures for deodorization equipment, denitrification equipment and exhaust gas equipment, ozone removal, removal of various viruses, materials for clean rooms, gas separation, alkaline elution, asbestos monitoring, detection of parasites, IR spectroscopy of particles in the air, analysis of algae in a river or sea, erythrocyte deformability tests, chemotaxis and culture chambers, scanning electron microscopes, radioactive assays, exfoliative cytology and X-ray fluorescence spectrometry. In the various applications, fine-structure filters are applied to such purposes as separation, purification, recovery and concentration.

However, in the case of separating fine particles with a fine-structure filter, microfiltration and ultrafiltration suffered from such problems as generation of resistance in the flow of a fluid passing therethrough due to a deposit layer (cake layer) formed under the influence of concentration polarization and an increased resistance due to clogging in a membrane filter, and these problems hampered the commercialization of the filter of this type.

A well-known filtration system for solving these problems is a so-called dead-end filtration system in which the whole fluid to be filtered is passed through a filtering medium and a cake layer to separate fine particles contained in the fluid.

However, in order for the fluid to pass through the filtering medium and the cake layer to separate material suspended in the fluid, the dead-end filtration system requires a pressure overcoming the resistance of the permeating fluid caused by the cake layer.

Therefore, when applied to microfiltration or ultrafiltration, the dead-end filtration system suffered from a decreased amount of filtration (amount of permeation) per membrane area and per unit time.

The applicant of the invention has provided techniques for improving the amount of filtration per membrane area and per unit time compared to the conventional dead-end filtration system by adopting a cross-flow filtration system which involves passing a feed to be filtered parallel to the membrane surface of a membrane filter and passing fluid through the membrane filter to the opposite side while suppressing formation of a cake layer by a support of the membrane filter provided on the side on which the feed flows (see JP 04-145929 A, JP 04-190834 A and JP 04-190835 A, for example).

However, since the membrane surface is parallel to the flow of the feed, the cross-flow filtration system is low in filtration accuracy and has difficulty in considerably improving the amount of filtration per membrane area and per unit time, and improvement methods are under study.

SUMMARY OF THE INVENTION

It is therefore an object of the invention to provide a cross-flow filtration method which is excellent in filtration accuracy and considerably improves the amount of filtration per membrane area and per unit time.

Another object of the invention is to provide a cross-flow filtration device used in implementing the cross-flow filtration method.

The inventor has made an intensive study to achieve the above objects and found that, by using as a membrane filter a porous alumina membrane filter made of an aluminum anodized film and having micropores whose degree of ordering, porosity and pore size standard deviation fall within predetermined ranges, the amount of filtration per membrane area and per unit time is considerably improved with higher filtration accuracy, and the invention has been completed.

Accordingly, the invention provides the following (i) and (ii).

(i) A method of cross-flow filtration using a membrane filter, comprising the step of:

feeding a fluid to be filtered across a membrane surface of a porous alumina membrane filter serving as the membrane filter so that the fluid flows parallel to the membrane surface to separate material to be filtered with the porous alumina membrane filter, wherein the porous alumina membrane filter is made of an aluminum anodized film and includes micropores having a degree of ordering as defined by formula (1):

$$\text{Degree of ordering (\%)} = B/A \times 100 \quad (1)$$

(wherein A represents a total number of micropores in a measurement region, and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore) of at least 50%, a porosity as defined by formula (2):

$$\text{Porosity (\%)} = C/D \times 100 \quad (2)$$

(wherein C represents a sum of opening areas of all the micropores in the measurement region; and D represents an area of the measurement region) of at least 40%, and a percentage of a pore size standard deviation to an average pore size of up to 10%.

(ii) A cross-flow filtration device in which a fluid to be filtered is fed across a surface of a membrane filter so as to flow parallel to the surface of the membrane filter to separate material to be filtered with the membrane filter, wherein the membrane filter is a porous alumina membrane filter, and the porous alumina membrane filter is made of an aluminum anodized film and includes micropores having a degree of ordering as defined by formula (1):

$$\text{Degree of ordering (\%)} = B/A \times 100 \quad (1)$$

(wherein A represents a total number of micropores in a measurement region, and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore) of at least 50%, a porosity as defined by formula (2):

$$\text{Porosity (\%)} = C/D \times 100 \quad (2)$$

(wherein C represents a sum of opening areas of all the micropores in the measurement region; and D represents an area of the measurement region) of at least 40%, and a percentage of a pore size standard deviation to an average pore size of up to 10%.

As will be described below, the cross-flow filtration method and the cross-flow filtration device that can be provided by the invention is excellent in filtration accuracy and considerably improves the amount of filtration per membrane area and per unit time.

The cross-flow filtration method of the invention can be applied not only to ultrafiltration but also to microfiltration with high filtration accuracy and is therefore very useful.

BRIEF DESCRIPTION OF THE DIAGRAMS

In the accompanying drawings.

DETAILED DESCRIPTION OF THE INVENTION

The invention is described below in detail.

The invention provides a method of cross-flow filtration using a membrane filter, comprising the step of feeding a fluid to be filtered across a membrane surface of a porous alumina membrane filter serving as the membrane filter so that the fluid flows parallel to the membrane surface to separate material to be filtered with the porous alumina membrane filter, wherein the porous alumina membrane filter is made of an aluminum anodized film and includes micropores having a degree of ordering as defined by formula (1) of at least 50%, a porosity as defined by formula (2) of at least 40%, and a percentage of a pore size standard deviation to an average pore size of up to 10%.

The invention also provides a cross-flow filtration device in which a fluid to be filtered that contains material to be filtered is separated with the filtration device, wherein the cross-flow filtration device includes at least a porous alumina membrane filter serving as a membrane filter, and the porous alumina membrane filter is made of an aluminum anodized film and includes micropores having a degree of ordering as defined by formula (1) of at least 50%, a porosity as defined by formula (2) of at least 40%, and a percentage of a pore size standard deviation to an average pore size of up to 10%.

Next, the porous alumina membrane filter that may be used in the cross-flow filtration method and the cross-flow filtration device according to the invention is described in detail.

[Porous Alumina Membrane Filter]

The porous alumina membrane filter that may be used in the cross-flow filtration method of the invention is made of an aluminum anodized film and includes micropores having a degree of ordering as defined by formula (1):

$$\text{Degree of ordering (\%)} = B/A \times 100 \quad (1)$$

(wherein A represents the total number of micropores in a measurement region, and B represents the number of specific micropores in the measurement region for which, when a circle is drawn so as to be centered on the center of gravity of a specific micropore and so as to be of the smallest radius that is internally tangent to the edge of another micropore, the circle includes the centers of gravity of six micropores other than the specific micropore) of at least 50%, a porosity as defined by formula (2):

$$\text{Porosity (\%)} = C/D \times 100 \quad (2)$$

(wherein C represents the sum of opening areas of all the micropores in the measurement region; and D represents the area of the measurement region) of at least 40%, and a percentage of the pore size standard deviation to the average pore size of up to 10%.

Figure 1A:
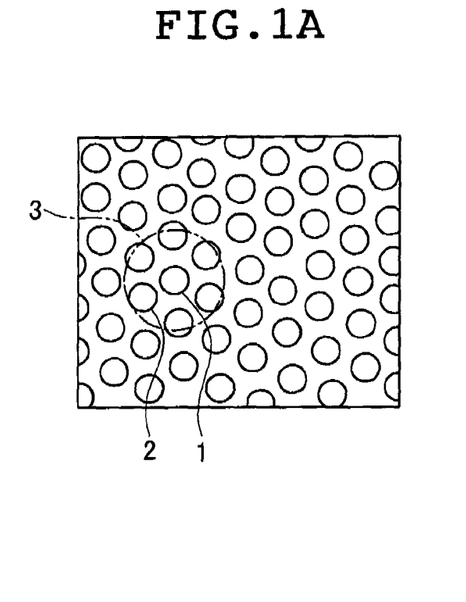
FIGS. 1A and 1B are diagrams illustrating a method for computing the degree of ordering of pores.
Figure 1B:
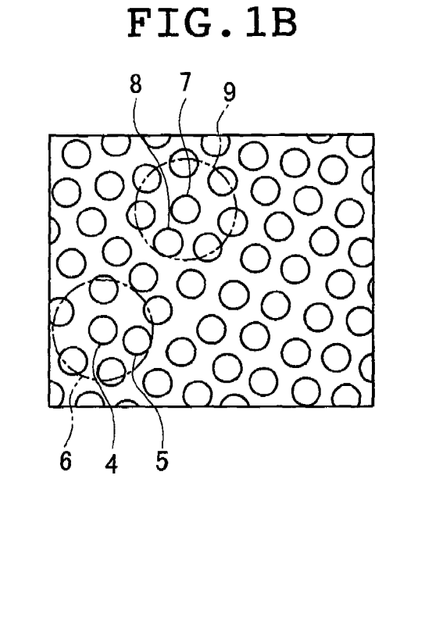

FIGS. 1A and 1B are diagrams illustrating a method for computing the degree of ordering of pores. Formula (1) is explained more fully below in conjunction with FIGS. 1A and 1B.

In the case of a first micropore 1 shown in FIG. 1A, when a circle 3 is drawn so as to be centered on the center of gravity of the first micropore 1 and so as to be of the smallest radius that is internally tangent to the edge of another micropore (inscribed in a second micropore 2), the interior of the circle 3 includes the centers of gravity of six micropores other than the first micropore 1. Therefore, the first micropore 1 is included in B.

In the case of another first micropore 4 shown in FIG. 1B, when a circle 6 is drawn so as to be centered on the center of gravity of the first micropore 4 and so as to be of the smallest radius that is internally tangent to the edge of another micropore (inscribed in a second micropore 5), the interior of the circle 6 includes the centers of gravity of five micropores other than the first micropore 4. Therefore, the first micropore 4 is not included in B.

In the case of yet another first micropore 7 shown in FIG. 1B, when a circle 9 is drawn so as to be centered on the center of gravity of the first micropore 7 and so as to be of the smallest radius that is internally tangent to the edge of another micropore (inscribed in a second micropore 8), the interior of the circle 9 includes the centers of gravity of seven micropores other than the first micropore 7. As a result, here too, the first micropore 7 is not included in B.

In formula (2), C represents the sum of the opening areas of all the micropores in the measurement region.

The micropore opening area as used herein refers to a geometric area determined by a computation method which involves binarizing a picture including micropore portions and non-micropore portions with image analysis software and computing the equivalent circular diameter of each of the micropore portions, in short, an area of each micropore portion assumed to be on a two-dimensional plane.

On the other hand, in the practice of the invention, the following formulas:

$$\text{Average pore size: } \mu_x = (1/n)\Sigma Xi$$

Pore size standard deviation:

$$\sigma = \sqrt{\frac{n\Sigma \mu_x^2 - (\Sigma \mu_x)^2}{n(n-1)}}$$

(wherein Xi represents the diameter of a micropore measured within an area of 1 μm$^2$) are used to determine the average micropore size (average pore size) and the micropore size (pore size) standard deviation (hereinafter abbreviated as "SD") for micropores present in a 1 μm×1 μm field on a surface image taken by a field emission scanning electron microscope (FE-SEM) (at a magnification, 20,000×).

The invention can considerably improve the amount of filtration per membrane area and per unit time by using a porous alumina membrane filter with micropores having a degree of ordering of at least 50% and a porosity of at least 40%.

The degree of ordering is preferably at least 60% and more preferably at least 80%.

The porosity is preferably at least 40% and more preferably at least 55%.

The invention can also improve the filtration accuracy by using a porous alumina membrane filter with micropores whose pore size SD falls within 10% of the average pore size.

The pore size SD is preferably within 7% and more preferably within 5% of the average pore size.

There is no particular limitation on the method of producing such a porous alumina membrane filter, but the porous alumina membrane filter is preferably formed by subjecting an aluminum substrate at least to, in order, anodizing treatment (hereinafter referred to as "anodizing treatment (A)") in which the aluminum substrate is anodized to form a micropore-bearing anodized film, separation treatment (hereinafter referred to as "separation treatment (B)") in which after the end of the above-described anodizing treatment, the aluminum substrate is removed to separate the anodized film from the aluminum substrate, and perforating treatment (hereinafter referred to as "perforating treatment (C)") in which micropores in the anodized film separated by the above-described separation treatment is made to extend through the anodized film.

Between separation treatment and perforating treatment or between perforating treatment and protection treatment to be described later, heating treatment (hereinafter referred to as "heating treatment (D)") in which the anodized film formed by anodizing treatment is heated at a temperature of at least 50° C. for at least 10 minutes may be optionally carried out.

In addition, perforating treatment is further preferably followed by protection treatment (hereinafter referred to as "protection treatment (E)") in which a protective film for preventing hydration is formed on the surfaces of the anodized film.

The aluminum substrate and the respective treatments are described below in detail.

[Aluminum Substrate]

The aluminum substrate is not subject to any particular limitation. Illustrative examples include pure aluminum plate; alloy plates composed primarily of aluminum and containing trace amounts of other elements; substrates made of low-purity aluminum (e.g., recycled material) on which high-purity aluminum has been vapor-deposited; substrates such as silicon wafers, quartz or glass whose surface has been covered with high-purity aluminum by a process such as vapor deposition or sputtering; and resin substrates on which aluminum has been laminated.

Of the aluminum substrate of the invention, the surface on which anodizing treatment to be described below is carried out has an aluminum purity of preferably at least 99.5 wt %, more preferably at least 99.9 wt % and even more preferably at least 99.99 wt %. At an aluminum purity within the above range, the micropore arrangement will be sufficiently well-ordered.

In the practice of the invention, the surface of the aluminum substrate on which the subsequently described anodizing treatment is to be carried out is preferably subjected beforehand to degreasing treatment and mirror-like finishing treatment and in particular to heat treatment in terms of improving the orderliness of the array of pores.

<Heat Treatment>

Heat treatment is preferably carried out at a temperature of from 200 to 350° C. for a period of about 30 seconds to about 2 minutes. To be more specific, a method that involves placing the aluminum substrate in a heated oven is used, for example.

Such heat treatment enhances the orderliness of the array of micropores formed in the subsequently described anodizing treatment.

Following heat treatment, it is preferable to rapidly cool the aluminum substrate. The method of cooling is exemplified by a method involving direct immersion of the aluminum substrate in water or the like.

<Degreasing Treatment>

Degreasing treatment is carried out with a suitable substance such as an acid, alkali or organic solvent so as to dissolve and remove organic substances, including dust, grease and resins, adhering to the aluminum substrate surface, and thereby prevent defects due to organic substances from arising in each of the subsequent treatments.

Preferred degreasing methods include the following: a method in which an organic solvent such as an alcohol (e.g., methanol), ketone (e.g., methyl ethyl ketone), petroleum benzin or volatile oil is contacted with the surface of the aluminum substrate at ambient temperature (organic solvent method); a method in which a liquid containing a surfactant such as soap or a neutral detergent is contacted with the surface of the aluminum substrate at a temperature of from ambient temperature to 80° C., after which the surface is rinsed with water (surfactant method); a method in which an aqueous sulfuric acid solution having a concentration of 10 to 200 g/L is contacted with the surface of the aluminum substrate at a temperature of from ambient temperature to 70° C. for a period of 30 to 80 seconds, following which the surface is rinsed with water; a method in which an aqueous solution of sodium hydroxide having a concentration of 5 to 20 g/L is contacted with the surface of the aluminum substrate at ambient temperature for about 30 seconds while electrolysis is carried out by passing a direct current through the aluminum substrate surface as the cathode at a current density of 1 to 10 A/dm$^2$, following which the surface is contacted with an aqueous solution of nitric acid having a concentration of 100 to 500 g/L and thereby neutralized; a method in which the surface of the aluminum substrate is contacted with any of various known anodizing electrolytic solutions at ambient temperature while electrolysis is carried out by passing a direct current at a current density of 1 to 10 A/dm$^2$ or an alternating current through the aluminum substrate surface as the cathode; a method in which an alkaline aqueous solution having a concentration of 10 to 200 g/L is contacted with the surface of the aluminum substrate at 40 to 50° C. for 15 to 60 seconds, following which the surface is contacted with an aqueous solution of nitric acid having a concentration of 100 to 500 g/L and thereby neutralized; a method in which an emulsion prepared by mixing a surfactant, water and the like into an oil such as gas oil or kerosene is contacted with the surface of the aluminum substrate at a temperature of from ambient temperature to 50° C., following which the surface is rinsed with water (emulsion degreasing method); and a method in which a mixed solution of, for example, sodium carbonate, phosphates and surfactant is contacted with the surface of the aluminum substrate at a temperature of from ambient temperature to 50° C. for 30 to 180 seconds, following which the surface is rinsed with water (phosphate method).

Of these, the organic solvent method, surfactant method, emulsion degreasing method and phosphate method are preferred from the standpoint of removing grease from the aluminum surface while causing substantially no aluminum dissolution.

Known degreasers may be used in degreasing treatment. For example, degreasing treatment may be carried out using any of various commercially available degreasers by the prescribed method.

<Mirror-Like Finishing Treatment>

Mirror-like finishing treatment is carried out to eliminate surface asperities of the aluminum substrate such as rolling streaks formed during rolling of the aluminum substrate and improve the uniformity and reproducibility of sealing treatment by a process such as electrodeposition.

In the practice of the invention, mirror-like finishing treatment is not subject to any particular limitation, and may be carried out using any suitable method known in the art. Examples of suitable methods include mechanical polishing, chemical polishing, and electrolytic polishing.

Illustrative examples of suitable mechanical polishing methods include polishing with various commercial abrasive cloths, and methods that combine the use of various commercial abrasives (e.g., diamond, alumina) with buffing. More specifically, a method which is carried out with an abrasive while changing over time the abrasive used from one having coarser particles to one having finer particles is appropriately illustrated. In such a case, the final abrasive used is preferably one having a grit size of 1500. In this way, a glossiness of at least 50% (in the case of rolled aluminum, at least 50% in both the rolling direction and the transverse direction) can be achieved.

Examples of chemical polishing methods include various methods mentioned in the $6^{th}$ edition of Aluminum Handbook (Japan Aluminum Association, 2001), pp. 164-165.

Preferred examples include phosphoric acid/nitric acid method, Alupol I method, Alupol V method, Alcoa R5 method, $H_3PO_4$—$CH_3COOH$—Cu method and $H_3PO_4$—$HNO_3$—$CH_3COOH$ method. Of these, the phosphoric acid/nitric acid method, the $H_3PO_4$—$CH_3COOH$—Cu method and the $H_3PO_4$—$HNO_3$—$CH_3COOH$ method are especially preferred.

With chemical polishing, a glossiness of at least 70% (in the case of rolled aluminum, at least 70% in both the rolling direction and the transverse direction) can be achieved.

Examples of electrolytic polishing methods include various methods mentioned in the $6^{th}$ edition of Aluminum Handbook (Japan Aluminum Association, 2001), pp. 164-165; the method described in U.S. Pat. No. 2,708,655; and the method described in Jitsumu Hyomen Gijutsu (Practice of Surface Technology), Vol. 33, No. 3, pp. 32-38 (1986).

With electrolytic polishing, a glossiness of at least 70% (in the case of rolled aluminum, at least 70% in both the rolling direction and the transverse direction) can be achieved.

These methods may be suitably combined and used. In an illustrative method that may be preferably used, mechanical polishing which is carried out by changing the abrasive over time from one having coarser particles to one having finer particles is followed by electrolytic polishing.

Mirror-like finishing treatment enables a surface having, for example, a mean surface roughness $R_a$ of 0.1 μm or less and a glossiness of at least 50% to be obtained. The mean surface roughness $R_a$ is preferably 0.03 μm or less, and more preferably 0.02 μm or less. The glossiness is preferably at least 70%, and more preferably at least 80%.

The glossiness is the specular reflectance which can be determined in accordance with JIS Z8741-1997 (Method 3: 60° Specular Gloss) in a direction perpendicular to the rolling direction. Specifically, measurement is carried out using a variable-angle glossmeter (e.g., VG-1D, manufactured by Nippon Denshoku Industries Co., Ltd.) at an angle of incidence/reflection of 60° when the specular reflectance is 70% or less, and at an angle of incidence/reflection of 20° when the specular reflectance is more than 70%.

[Anodizing Treatment (A)]

In anodizing treatment (A), the aluminum substrate is anodized to form a micropore-bearing anodized film on the surface of the aluminum substrate.

A conventionally known method may be used for anodizing treatment. More specifically, the subsequently described self-ordering method is preferably used.

The self-ordering method is a method which enhances the orderliness by using the regularly arranging nature of micropores in the anodized film and eliminating factors that may disturb an orderly arrangement. Specifically, an anodized film is formed on high-purity aluminum at a voltage appropriate for the type of electrolytic solution and at a low speed over an extended period of time (e.g., from several hours to well over ten hours).

In this method, because the micropore size is dependent on the voltage, to some degree it is possible to obtain the desired micropore size by controlling the voltage.

To form micropores by the self-ordering method, the subsequently described anodizing treatment (a-1) should be carried out. However, micropore formation is preferably carried out by a process in which the subsequently described anodizing treatment (a-1), film removal treatment (a-2) and re-anodizing treatment (a-3) are carried out in this order.

<Anodizing Treatment (a-1)>

The average flow velocity of electrolytic solution in anodizing treatment is preferably from 0.5 to 20.0 m/min, more preferably from 1.0 to 15.0 m/min, and even more preferably from 2.0 to 10.0 m/min. By carrying out anodizing treatment at the foregoing flow velocity, a uniform and high degree of ordering can be achieved.

The method for causing the electrolytic solution to flow under the above conditions is not subject to any particular limitation. For example, a method involving the use of a common agitator such as a stirrer may be employed. The use of a stirrer in which the stirring speed can be controlled with a digital display is particularly desirable because it enables the average flow velocity to be regulated. An example of such a stirrer is the Magnetic Stirrer HS-50D (manufactured by As One Corporation).

Anodizing treatment (a-1) may be carried out by, for example, a method in which current is passed through the aluminum substrate as the anode in a solution having an acid concentration of from 0.01 to 5 mol/L.

The solution used in anodizing treatment (a-1) is preferably an acid solution. A solution of sulfuric acid, phosphoric acid, chromic acid, oxalic acid, sulfamic acid, benzenesulfonic acid, amidosulfonic acid, glycolic acid, tartaric acid, malic acid or citric acid is more preferred. Of these, a solution of sulfuric acid, phosphoric acid or oxalic acid is especially preferred. These acids may be used singly or as combinations of two or more thereof.

The anodizing treatment (a-1) conditions vary depending on the electrolytic solution employed, and thus cannot be strictly specified. However, the following conditions are generally preferred: an electrolytic solution concentration of from 0.01 to 5 mol/L, a solution temperature of from −10 to +30° C., a current density of from 0.01 to 20 A/dm$^2$, a voltage of from 3 to 300 V, and an electrolysis time of from 0.5 to 30 hours. An electrolytic solution concentration of from 0.05 to 3 mol/L, a solution temperature of from −5 to +25° C., a current density of from 0.05 to 15 A/dm$^2$, a voltage of from 5 to 250 V, and an electrolysis time of from 1 to 25 hours are more preferred. An electrolytic solution concentration of from 0.1 to 1 mol/L, a solution temperature of from 0 to 20° C., a current density of from 0.1 to 10 A/dm$^2$, a voltage of from 10 to 200 V, and an electrolysis time of from 2 to 20 hours are even more preferred.

The treatment time in anodizing treatment (a-1) is preferably from 0.5 minute to 16 hours, more preferably from 1 minute to 12 hours, and even more preferably from 2 minutes to 8 hours.

Aside from being carried out at a constant voltage, anodizing treatment (a-1) may be carried out using a method in which the voltage is intermittently or continuously varied. In such cases, it is preferable to have the voltage gradually decrease. It is possible in this way to lower the resistance of the anodized film, bringing about the formation of small micropores in the anodized film. As a result, this approach is preferable for improving uniformity, particularly when sealing is subsequently carried out by electrodeposition treatment.

In the invention, the anodized film formed by such anodizing treatment (a-1) has a thickness of preferably from 0.1 to 2,000 μm, more preferably from 1 to 1,000 μm, and even more preferably from 10 to 500 μm.

In the invention, the micropores formed by such anodizing treatment (a-1) preferably have a pore size of 0.01 to 0.5 μm.

The micropores have an average pore density of preferably from 50 to 1,500 pores/μm$^2$.

Also, it is preferable for the micropores to have a surface coverage of from 20 to 50%, the surface coverage of the micropores being defined here as the ratio of the total surface area of the micropore openings to the surface area of the aluminum surface.

<Film Removal Treatment (a-2)>

In film removal treatment (a-2), the anodized film formed on the surface of the aluminum substrate by the above-described anodizing treatment (a-1) is dissolved and removed.

The subsequently described separation treatment (B) may be carried out immediately after forming an anodized film on the surface of the aluminum substrate by the above-described anodizing treatment (a-1). However, after the anodizing treatment (a-1), it is preferable to additionally carry out film removal treatment (a-2) and the subsequently described re-anodizing treatment (a-3) in this order, followed by the subsequently described separation treatment (B).

Given that the orderliness of the anodized film increases as the aluminum substrate is approached, by using this film removal treatment (a-2) to remove the anodized film that has been formed in (a-1), the lower portion of the anodized film remaining on the aluminum substrate emerges at the surface, affording an orderly array of pits. Therefore, in film removal treatment (a-2), aluminum is not dissolved; only the anodized film composed of alumina (aluminum oxide) is dissolved.

The alumina dissolving solution is preferably an aqueous solution containing at least one substance selected from the group consisting of chromium compounds, nitric acid, phosphoric acid, zirconium compounds, titanium compounds, lithium salts, cerium salts, magnesium salts, sodium hexafluorosilicate, zinc fluoride, manganese compounds, molybdenum compounds, magnesium compounds, barium compounds, and uncombined halogens.

Illustrative examples of chromium compounds include chromium (III) oxide and chromium (VI) oxide.

Examples of zirconium compounds include zirconium ammonium fluoride, zirconium fluoride and zirconium chloride.

Examples of titanium compounds include titanium oxide and titanium sulfide.

Examples of lithium salts include lithium fluoride and lithium chloride.

Examples of cerium salts include cerium fluoride and cerium chloride.

Examples of magnesium salts include magnesium sulfide.

Examples of manganese compounds include sodium permanganate and calcium permanganate.

Examples of molybdenum compounds include sodium molybdate.

Examples of magnesium compounds include magnesium fluoride pentahydrate.

Examples of barium compounds include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, and hydrates thereof. Of the above barium compounds, barium oxide, barium acetate and barium carbonate are preferred. Barium oxide is especially preferred.

Examples of uncombined halogens include chlorine, fluorine and bromine.

Of the above, the alumina dissolving solution is preferably an acid-containing aqueous solution. Examples of the acid include sulfuric acid, phosphoric acid, nitric acid and hydrochloric acid. A mixture of two or more acids is also acceptable.

The acid concentration is preferably at least 0.01 mol/L, more preferably at least 0.05 mol/L, and even more preferably at least 0.1 mol/L. Although there is no particular upper limit in the acid concentration, in general, the concentration is preferably 10 mol/L or less, and more preferably 5 mol/L or less. A needlessly high concentration is uneconomical, in addition to which higher concentrations may result in dissolution of the aluminum substrate.

The alumina dissolving solution has a temperature of preferably −10° C. or higher, more preferably −5° C. or higher, and even more preferably 0° C. or higher. Carrying out treatment using a boiling alumina dissolving solution destroys or disrupts the starting points for ordering. Hence, the alumina dissolving solution is preferably used without being boiled.

An alumina dissolving solution dissolves alumina, but does not dissolve aluminum. Here, the alumina dissolving solution may dissolve a very small amount of aluminum, so long as it does not dissolve a substantial amount of aluminum.

Film removal treatment (a-2) is carried out by bringing an aluminum substrate on which an anodized film has been formed into contact with the above-described alumina dissolving solution. Examples of the contacting method include, but are not limited to, dipping and spraying. Of these, dipping is preferred.

Dipping is a treatment in which the aluminum substrate on which an anodized film has been formed is immersed in the alumina dissolving solution. To achieve uniform treatment, it is desirable to carry out stirring at the time of dipping treatment.

The dipping treatment time is preferably at least 10 minutes, more preferably at least 1 hour, even more preferably at least 3 hours, and most preferably at least 5 hours.

<Re-Anodizing Treatment (a-3)>

After the anodized film is removed by the above-described film removal treatment (a-2) and well-ordered pits are formed on the surface of the aluminum substrate, by carrying out anodizing treatment once again, an anodized film having micropores with an even higher degree of ordering can be formed.

Re-anodizing treatment (a-3) may be carried out using a method known in the art, although it is preferably carried out under the same conditions as the above-described anodizing treatment (a-1).

Alternatively, suitable use may be made of a method in which the current is repeatedly turned on and off while keeping the dc voltage constant, or a method in which the current is repeatedly turned on and off while intermittently varying the dc voltage. Because these methods result in the formation of small micropores in the anodized film, they are preferable for improving uniformity, particularly when sealing is to be carried out by electrodeposition treatment.

When re-anodizing treatment (a-3) is carried out at a low temperature, the array of micropores is well-ordered and the pore size is uniform.

On the other hand, by carrying out re-anodizing treatment (a-3) at a relatively high temperature, the micropore array may be disrupted or the variance in pore size may be set within a given range. The variance in pore size may also be controlled by means of the treatment time.

In the practice of the invention, the anodized film formed by such re-anodizing treatment (a-3) has a thickness of preferably from 0.1 to 1,000 µm, more preferably from 1 to 500 µm and even more preferably from 10 to 500 µm.

Moreover, in the invention, the micropores formed in the anodized film by such re-anodizing treatment (a-3) have a diameter of preferably from 0.01 to 0.5 µm.

The average pore density is preferably from 50 to 1,500 pores/µm$^2$.

In the practice of the invention, in place of the above-described anodizing treatment (a-1) and film removal treatment (a-2), use may be made of, for example, a physical method, a particle beam method, a block copolymer method or a resist patterning/exposure/etching process to form pits as starting points for micropore formation by the above-described re-anodizing treatment (a-3).

<Physical Method>

Physical methods are exemplified by methods which use imprinting (transfer methods and press patterning methods in which a plate or roll having projections thereon is pressed against the aluminum substrate to form depressions on the plate) A specific example is a method in which a plate having numerous projections on a surface thereof is pressed against the aluminum surface, thereby forming depressions. For example, the method described in JP 10-121292 A may be used.

Another example is a method in which polystyrene spheres are densely arranged on the aluminum surface, $SiO_2$ is vapor-deposited onto the spheres, then the polystyrene spheres are removed and the substrate is etched using the vapor-deposited $SiO_2$ as the mask, thereby forming depressions.

<Particle Beam Method>

In a particle beam method, depressions are formed by irradiating the aluminum surface with a particle beam. This method has the advantage that the positions of the depressions can be freely controlled.

Examples of the particle beam include a charged particle beam, a focused ion beam (FIB), and an electron beam.

An example of the particle beam method that may be used is the method described in JP 2001-105400 A.

<Block Copolymer Method>

The block copolymer method involves forming a block copolymer layer on the aluminum surface, forming an islands-in-the-sea structure in the block copolymer layer by thermal annealing, then removing the island components to form depressions.

An example of the block copolymer method that may be used is the method described in JP 2003-129288 A.

<Resist Patterning/Exposure/Etching Process>

In a resist patterning/exposure/etching process, resist on the surface of an aluminum plate is exposed and developed by photolithography or electron-beam lithography to form a resist pattern. The resist is then etched, forming depressions which pass entirely through the resist to the aluminum surface.

In the invention, the micropore-bearing anodized film may be formed on the surface of the aluminum substrate by carrying out, in order, the above-described anodizing treatment (A) including the following steps (1) to (4):

(1) a step of subjecting a surface of the aluminum substrate to a first anodizing treatment to form a micropore-bearing anodized film on the surface of the aluminum substrate;

(2) a step of partially dissolving the anodized film using an acid or alkali;

(3) a step of performing a second anodizing treatment to grow the micropores in their depth direction; and (4) a step of removing a part of the anodized film above inflection points in cross section of the micropores.

<Step (1)>

In Step (1), at least one surface of the aluminum substrate is anodized to form a micropore-bearing anodized film on the surface of the aluminum substrate.

Step (1) may be carried out in the same procedure as in the above-mentioned anodizing treatment (a-1).

FIGS. 2A to 2D are schematic cross-sectional views of an aluminum substrate and an anodized film formed on the aluminum substrate, for illustrating a porous alumina membrane filter used in the invention.

Figure 2A:
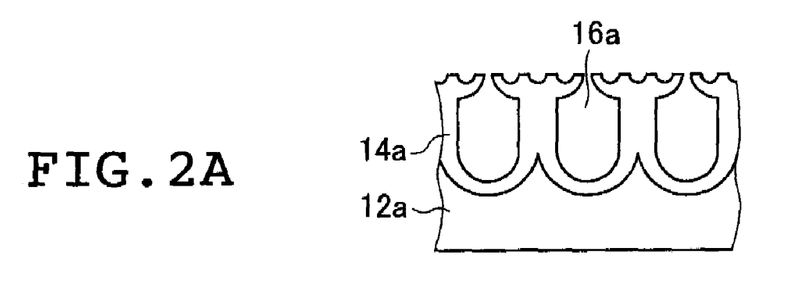
FIGS. 2A to 2D are schematic cross-sectional views of an aluminum substrate and an anodized film formed on the aluminum substrate, for illustrating a porous alumina membrane filter used in the invention.

FIG. 2A shows that an anodized film 14a bearing micropores 16a was formed on the surface of an aluminum substrate 12a in Step (1).

<Step (2)>

In Step (2), an acid or an alkali is used to partially dissolve the anodized film formed in Step (1).

Figure 2B:
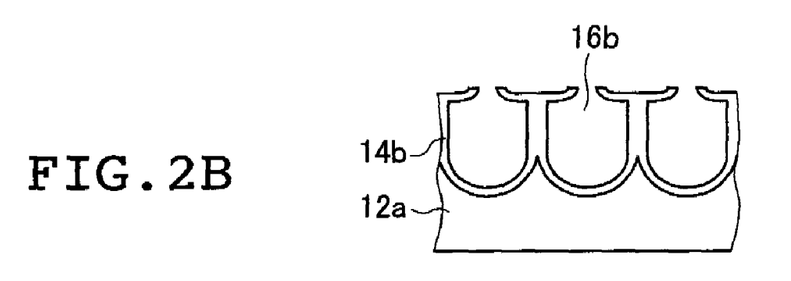

"Partially dissolve the anodized film" as used herein refers not to completely dissolving the anodized film formed in Step (1) but to partially dissolving the surface of the anodized film 14a and the interiors of the micropores 16a shown in FIG. 2A so that an anodized film 14b bearing micropores 16b remains on the aluminum substrate 12a as shown in FIG. 2B.

The amount of material dissolved from the anodized film is preferably in a range of 0.001 to 50 wt %, more preferably 0.005 to 30 wt % and even more preferably 0.01 to 15 wt % with respect to the whole anodized film. Within the above range, disordered array portions at the anodized film surface can be dissolved out to enhance the orderliness of the array of micropores. In addition, the anodized film remains at the micropore bottoms to enable the anodized film to keep having starting points for anodizing treatment to be performed in Step (3).

Step (2) is performed by bringing the anodized film formed on the aluminum substrate into contact with an aqueous acid solution or aqueous alkali solution. The contacting method is not particularly limited and is exemplified by immersion and spraying. Of these, immersion is preferable.

When Step (2) is to be performed with an aqueous acid solution, it is preferable to use an aqueous solution of an inorganic acid such as sulfuric acid, phosphoric acid, nitric acid or hydrochloric acid, or a mixture thereof. It is particularly preferable to use an aqueous solution containing no chromic acid in terms of its high degree of safety. It is desirable for the aqueous acid solution to have a concentration of 0.01 to 1 mol/L and a temperature of 25 to 60° C.

When Step (2) is to be performed with an aqueous alkali solution, it is preferable to use an aqueous solution of at least one alkali selected from the group consisting of sodium hydroxide, potassium hydroxide and lithium hydroxide. It is preferable for the aqueous alkali solution to have a concentration of 0.01 to 1 mol/L and a temperature of 20 to 35° C.

Specific examples of preferred solutions include a 40° C. aqueous solution containing 0.5 mol/L of phosphoric acid, a 30° C. aqueous solution containing 0.05 mol/L of sodium hydroxide, and a 30° C. aqueous solution containing 0.05 mol/L of potassium hydroxide.

The aluminum substrate having the anodized film formed thereon is immersed in the aqueous acid solution or aqueous alkali solution for a period of preferably 8 to 120 minutes, more preferably 10 to 90 minutes, and even more preferably 15 to 60 minutes.

<Step (3)>

In Step (3), the aluminum substrate having thereon the anodized film partially dissolved in Step (2) is subjected to anodizing treatment again to grow the micropores in the depth direction.

Figure 2C:
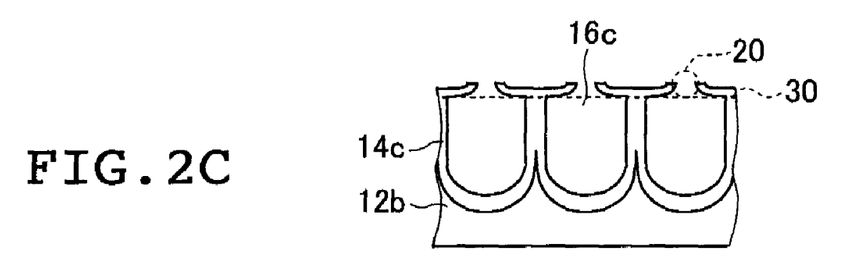

As shown in FIG. 2C, anodizing treatment in Step (3) allows the oxidation of the aluminum substrate 12a shown in FIG. 2B to proceed to form on an aluminum substrate 12b an anodized film 14c that has micropores 16c grown in the depth direction more than the micropores 16b.

Anodizing treatment may be performed using a method known in the art, although it is preferably performed under the same conditions as the above-described anodizing treatment (a-1).

Suitable use can also be made of a method in which the current is repeatedly turned on and off in an intermittent manner while keeping the dc voltage constant, and a method in which the current is repeatedly turned on and off while intermittently changing the dc voltage. Because these methods enable formation of fine micropores at the anodized film, they are preferable for improving uniformity, particularly when sealing is carried out by electrodeposition.

In the above method in which the voltage is intermittently changed, it is preferable to gradually reduce the voltage. It is possible in this way to lower the resistance in the anodized film, enabling uniformity to be achieved when electrodeposition is carried out later.

The thickness of the anodized film is preferably increased by 0.1 to 100 µm and more preferably 0.5 to 50 µm. Within the above range, the orderliness of the array of micropores can be more enhanced.

<Step (4)>

A part of the anodized film above inflection points 30 in cross section of the micropore 16c shown in FIG. 2C is removed in Step (4). As shown in FIG. 2C, the micropore 16c formed by the self-ordering method has an approximately straight tube shape in cross section except the upper part of the micropore 16c. In other words, the micropore 16c has in its upper part a portion which differs in cross-sectional shape from the other part of the micropore 16c. This portion 20 is hereinafter referred to as the "different shape portion 20". In Step (4), a part of the anodized film above the inflection points 30 in cross section of the micropore 16c is removed to eliminate the different shape portion 20 in the upper part of the micropore 16c.

The "inflection point" 30 as used herein refers to a point where the cross-sectional shape of the micropore 16c considerably changes from the main shape (approximately straight tube shape in this case), in other words, to a point where the shape continuity from the main shape (approximately straight tube shape) is lost in the cross section of the micropore 16c.

Figure 2D:
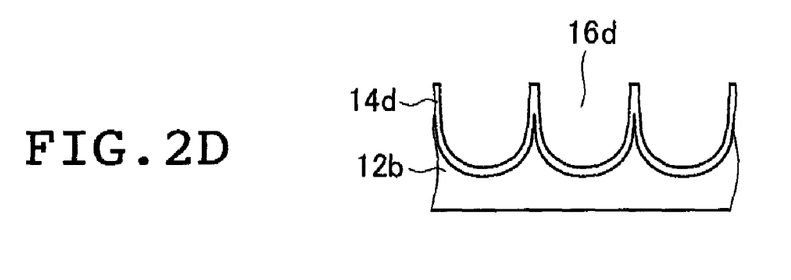

Removal of a part of the anodized film above the inflection points 30 in cross section of the micropore 16c provides a micropore 16d having an approximately straight tube shape as a whole as shown in FIG. 2D.

In Step (4), the cross sectional image of the anodized film 14c after the end of Step (3) may be taken by FE-SEM to specify the inflection points 30 in cross section of the micropore 16c so that a part of the anodized film above the inflection points 30 can be removed.

The micropore has the different shape portion mainly in the case where the anodized film 14a was newly formed on the aluminum substrate 12a as in Step (1). Therefore, the anodized film formed in Step (1) is removed in Step (4) in order to remove a part of the anodized film above the inflection points 30 in cross section of the micropore 16c to eliminate the different shape portion 20 in the upper part of the micropore 16c.

In the case where Steps (3) and (4) are repeatedly performed twice or more as will be described later, an anodized film 14d after the end of Step (4) from which the different shape portion 20 has been removed has the micropore 16d which is in an approximately straight tube shape as a whole, so that a micropore formed in Step (3) following Step (4) (referred to as Step (3') in this paragraph) has a new different shape portion in its upper part. Therefore, in Step (4) following Step (3') (referred to as Step (4') in this paragraph), it is necessary to remove the different shape portion newly formed in the upper part of the micropore in Step (3'), which requires removal of a part of the anodized film above the inflection points in cross section of the micropore formed in Step (3').

For example, polishing treatments such as mechanical polishing, chemical polishing and electrolytic polishing may be used to remove a part of the anodized film above the inflection points 30 in cross section of the micropores 16c. However, it is preferable to use a treatment in which the anodized film is dissolved using an acid or an alkali as in Step (2). In this case, the anodized film 14d which is thinner than the anodized film 14c shown in FIG. 2C is formed as shown in FIG. 2D.

In the case where an acid or an alkali is used to partially dissolve the anodized film in Step (4), the amount of material dissolved from the anodized film is not particularly limited and is preferably in a range of 0.01 to 30 wt % and more preferably 0.1 to 15 wt % with respect to the whole anodized film. Within the above range, disordered array portions at the anodized film surface can be dissolved out to enhance the orderliness of the array of micropores. In the case where Steps (3) and (4) are repeatedly performed twice or more, the anodized film can keep having starting points for one or more anodizing treatments in Step (3) to be performed in the second and any subsequent cycles.

In terms of enhancing the orderliness of the array of micropores, Steps (3) and (4) are repeatedly performed preferably twice or more, more preferably three times or more, and even more preferably four times or more.

In the case where these steps are repeatedly performed twice or more, the conditions in Steps (3) and (4) of the respective cycles may be the same or different. In terms of improving the degree of ordering, Step (3) is preferably performed by changing the voltage in each cycle. In this case, it is more preferable to gradually shift to higher voltage conditions in terms of improving the degree of ordering.

In the state shown in FIG. 2D, it is preferred for the average pore density to be 50 to 1,500 pores /µm$^2$ and for the micropores to have a surface coverage of from 20 to 50%.

Figure 3:
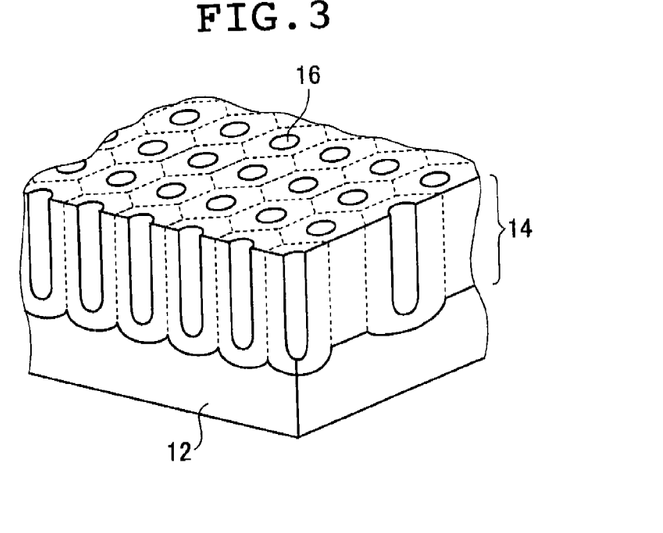
FIG. 3 is a partial sectional view showing the state after anodizing treatment (A)

FIG. 3 is a partial sectional view showing the state after anodizing treatment (A). As shown in FIG. 3, an anodized film 14 bearing micropores 16 is formed on a surface of an aluminum substrate 12.

[Separation Treatment (B)]

Separation treatment (B) is a treatment in which following the above-described anodizing treatment (A), the aluminum substrate is removed to separate the anodized film from the aluminum substrate.

Figure 4:
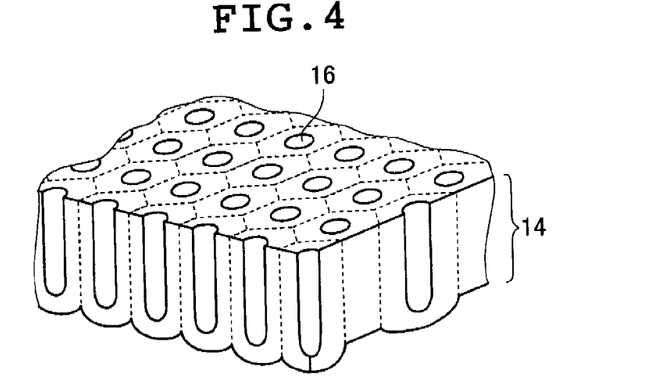
FIG. 4 is a partial sectional view showing the state after separation treatment (B)

Aluminum substrate removal treatment serves to dissolve and remove the aluminum substrate 12 from the state shown in FIG. 3. FIG. 4 is a partial sectional view showing the state after separation treatment (B) and illustrates a microstructure having the anodized film 14 bearing the micropores 16.

Therefore, a treatment solution that dissolves not alumina but aluminum is used in aluminum removal treatment.

The treatment solution is not particularly limited as long as the solution used dissolves not alumina but aluminum. Examples of the treatment solution that may be used include aqueous solutions of mercury chloride, a bromine/methanol mixture, a bromine/ethanol mixture, aqua regia and a hydrochloric acid/copper chloride mixture.

The concentration is preferably from 0.01 to 10 mol/L and more preferably from 0.05 to 5 mol/L.

The treatment temperature is preferably from −10° C. to 80° C. and more preferably from 0° C. to 60° C.

Aluminum removal treatment is carried out by bringing the aluminum substrate having the anodized film formed thereon into contact with the treatment solution described above. The contacting method is not particularly limited and is exemplified by immersion and spraying. Of these, immersion is preferable. The contacting time is preferably from 10 seconds to 5 hours and more preferably from 1 minute to 3 hours.

After aluminum removal treatment, the anodized film preferably has a thickness of 1 to 1,000 μm and more preferably 10 to 500 μm.

After aluminum removal treatment, the anodized film 14 is preferably rinsed with water prior to the subsequently described perforating treatment (C). Rinsing with water is preferably carried out at 30° C. or lower in order to suppress the changes in the pore size of the micropores 16 due to hydration.

[Perforating Treatment (C)]

Perforating treatment (C) is a treatment in which the micropores in the anodized film separated by the above-described separation treatment (B) or those in the anodized film following the subsequently described heating treatment (D) if the separation treatment (B) is followed by the heating treatment (D) are made to extend through the anodized film.

Figure 5:
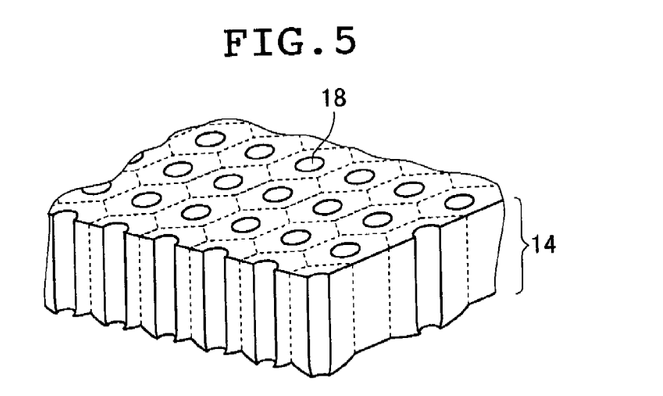
FIG. 5 is a partial sectional view showing the state after perforating treatment (C)

In perforating treatment (C), the anodized film 14 bearing the micropores 16 shown in FIG. 4 is partially dissolved by immersion in an aqueous acid solution or aqueous alkali solution. The anodized film 14 at the bottoms of the micropores 16 is thus removed to make the micropores 16 extend through the anodized film 14 (to form through micropores 18). FIG. 5 is a partial sectional perspective view showing the state after perforating treatment (C) and illustrates a microstructure having the anodized film 14 bearing the through micropores 18.

In FIG. 5, all the micropores in the anodized film 14 are the through micropores 18. Not all the micropores in the anodized film 14 may extend therethrough after perforating treatment (C), but it is preferable for 70% of the micropores in the anodized film to extend therethrough after perforating treatment (C).

When perforating treatment (C) is to be carried out with an aqueous acid solution, it is preferable to use an aqueous solution of an inorganic acid such as sulfuric acid, phosphoric acid, nitric acid or hydrochloric acid, or a mixture thereof. It is preferable for the aqueous acid solution to have a concentration of 1 to 10 wt % and a temperature of 25 to 40° C.

When perforating treatment (C) is to be carried out with an aqueous alkali solution, it is preferable to use an aqueous solution of at least one alkali selected from the group consisting of sodium hydroxide, potassium hydroxide and lithium hydroxide. It is preferable for the aqueous alkali solution to have a concentration of 0.1 to 5 wt % and a temperature of 20 to 35° C.

Specific examples of preferred solutions include a 40° C. aqueous solution containing 50 g/L of phosphoric acid, a 30° C. aqueous solution containing 0.5 g/L of sodium hydroxide, and a 30° C. aqueous solution containing 0.5 g/L of potassium hydroxide.

The anodized film is immersed in the aqueous acid solution or aqueous alkali solution for a period of preferably 8 to 120 minutes, more preferably 10 to 90 minutes, and even more preferably 15 to 60 minutes.

After perforating treatment (C), the anodized film preferably has a thickness of 1 to 1,000 μm and more preferably 10 to 500 μm.

After perforating treatment (C), the anodized film 14 is rinsed with water. Rinsing with water is preferably carried out at 30° C. or lower in order to suppress the changes in the pore size of the through micropores 18 due to hydration.

[Heating Treatment (D)]

Heating treatment (D) is a treatment in which the anodized film formed by the anodizing treatment (A) is heated at a temperature of 50° C. or higher for at least 10 minutes between the separation treatment (B) and the perforating treatment (C), or between the perforating treatment (C) and the subsequently described protection treatment (E).

The inventor of the invention has made an intensive study and as a result found that acid ions derived from an electrolytic solution used in anodizing treatment, a solution used in film removal treatment to dissolve alumina, and treatment solutions used in the above-described removal of the aluminum substrate and micropore-perforating treatment, for example, $SO_4^{2-}$ in the case where sulfuric acid was used for the electrolytic solution may remain in the anodized film to impair the resistance to acids and alkalis of the anodized film.

By heating the anodized film, such acid ions that may remain in the anodized film are removed and the anodized film has improved resistance to acids and alkalis. It is presumed that an acid ion remaining in the anodized film would dissolve in moisture remaining in the anodized film, and upon heating the anodized film, be removed along with evaporation of the moisture remaining in the anodized film.

A heating temperature of less than 50° C. is not sufficient to implement the action of removing an acid ion that remains in the anodized film.

The heating temperature is preferably at least 150° C., more preferably at least 200° C. and even more preferably at least 400° C.

A heating time of less than 10 minutes is not sufficient to implement the action of removing an acid ion that remains in the anodized film.

The heating time is preferably at least 15 minutes, more preferably at least 30 minutes and even more preferably at least 1 hour.

Heating for 10 hours or more no longer contributes to the action of removing an acid ion remaining in the anodized film and is therefore not preferable in terms of yield and energy efficiency.

It is preferred to rapidly cool the thus heated anodized film.

From the viewpoint of transforming the porous alumina membrane filter obtained to a desired shape, heating treatment (D) of the invention may be carried out by a method which involves heating the anodized film while applying a load. For example, a flat membrane filter with higher flatness can be produced by performing heating treatment while a load is applied to the filter being sandwiched between flat pressing plates.

[Protection Treatment (E)]

Protection treatment (E) is a treatment in which a protective film for preventing hydration is formed on the surfaces of the anodized film after perforating treatment (C) or after heating treatment (D) if the perforating treatment (C) is followed by the heating treatment (D).

Protection treatment (E) forms a protective film for preventing hydration of the anodized film over the entire surfaces of the anodized film 14 including the interiors of the through micropores 18 in the porous alumina membrane filter made of the anodized film 14 having the through micropores 18 shown in FIG. 5.

Illustrative examples of protective films include inorganic protective films containing at least one selected from the group consisting of elemental zirconium and elemental silicon, and organic protective films containing a water-insoluble polymer.

<Inorganic Protective Film>

The method of forming an elemental zirconium-containing protective film is not subject to any particular limitation, although a commonly used method of treatment involves direct immersion in an aqueous solution in which a zirconium compound is dissolved. From the standpoint of the strength and stability of the protective film, the use of an aqueous solution in which a phosphorus compound has also been dissolved is preferred.

Illustrative examples of the zirconium compound that may be used include zirconium, zirconium fluoride, sodium hexafluorozirconate, calcium hexafluorozirconate, zirconium chloride, zirconium oxychloride, zirconium oxynitrate, zirconium sulfate, zirconium ethoxide, zirconium propoxide, zirconium butoxide, zirconium acetylacetonate, tetrachlorobis(tetrahydrofuran)zirconium, bis(methylcyclopentadienyl) zirconium dichloride, dicyclopentadienylzirconium dichloride and ethylenebis(indenyl)zirconium (IV) dichloride. Of these, sodium hexafluorozirconate is preferred. From the standpoint of the uniformity of the protective film thickness, the concentration of the zirconium compound in the aqueous solution is preferably from 0.01 to 10 wt %, and more preferably from 0.05 to 5 wt %.

Illustrative examples of the phosphorus compound that may be used include phosphoric acid, sodium phosphate, calcium phosphate, dibasic sodium phosphate and dibasic calcium phosphate. Of these, dibasic sodium phosphate is preferred. From the standpoint of the uniformity of the protective film thickness, the concentration of the phosphorus compound in the aqueous solution is preferably from 0.1 to 20 wt %, and more preferably from 0.5 to 10 wt %.

In order for the protective film formed to have an improved function of preventing hydration of the anodized film, an aqueous solution of a zirconium compound preferably contains tannic acid when immersion treatment is carried out. In this case, the concentration of the tannic acid in the aqueous solution is preferably from 0.05 to 10 wt % and more preferably from 0.1 to 5 wt %.

The treatment temperature is preferably from 0 to 120° C., and more preferably from 20 to 100° C.

The method of forming a protective film containing elemental silicon is not subject to any particular limitation, although a commonly used method of treatment involves direct immersion in an aqueous solution in which an alkali metal silicate is dissolved.

The thickness of the protective film can be adjusted by varying the ratio between the silicate ingredients silicon dioxide $SiO_2$ and alkali metal oxide $M_2O$ (generally represented as the molar ratio $[SiO_2]/[M_2O]$) and the concentrations thereof in the aqueous solution of an alkali metal silicate. It is especially preferable here to use sodium or potassium as M.

The molar ratio $[SiO_2]/[M_2O]$ is preferably from 0.1 to 5.0, and more preferably from 0.5 to 3.0. The $SiO_2$ content is preferably from 0.1 to 20 wt %, and more preferably from 0.5 to 10 wt %.

<Organic Protective Film>

The organic protective film is preferably obtained by a method which involves direct immersion in an organic solvent in which a water-insoluble polymer is dissolved, followed by heat treatment to evaporate off only the solvent.

Illustrative examples of the water-insoluble polymer include polyvinylidene chloride, poly(meth)acrylonitrile, polysulfone, polyvinyl chloride, polyethylene, polycarbonate, polystyrene, polyamide and cellophane.

Illustrative examples of the organic solvent include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethylsulfoxide, sulfolane, γ-butyrolactone and toluene. The concentration is preferably from 0.1 to 50 wt %, and more preferably from 1 to 30 wt %.

The heating temperature during solvent evaporation is preferably from 30 to 300° C., and more preferably from 50 to 200° C.

Following protection treatment, the protective film has a thickness of preferably from 1 to 50 nm, and more preferably from 5 to 25 nm.

[Application to Cross-Flow Filtration System]

The cross-flow filtration method of the invention is a method in which a fluid to be filtered is fed parallel to the membrane surface of the porous alumina membrane filter described above in detail to separate material to be filtered with the membrane filter.

The cross-flow filtration device of the invention is a filtration device including the porous alumina membrane filter described above in detail which serves as the membrane filter and a flow pass to flow a fluid to be filtered parallel to the surface of the membrane filter.

The porous alumina membrane filter may be appropriately attached to commonly known cross-flow filtration devices to be used as the membrane filter.

For example, the porous alumina membrane filter may be applied to cross-flow filtration methods and devices as described in JP 56-129599 U, JP 59-209612 A, JP 59-209613 A, JP 2-21929 A, JP 3-89908 A, JP 3-98608 A, JP 3-135405 A, JP 4-145929 A, JP 4-150930 A, JP 4-190834 A, JP 4-190835 A, JP 4-293521 A, JP 4-293522 A, JP 4-298224 A, JP 62-190621 U, JP 5-146645 A, JP 5-279012 A, JP 6-190247 A, JP 6-218249 A, JP 7-60029 A, JP 7-185273 A, JP 9-136020 A, JP 2000-157842 A, JP 2002-11332 A, JP 2003-225661 A, JP 62-502314 A, JP 8-512244 A, JP 2000-504275 A, JP 2000-513580 A, JP 2002-518169 A, JP 2002-537104 A, JP 2003-508194 A, JP 2003-519004 A, JP 2003-519005 A, JP 2003-535582 A, JP 2004-522569 A, JP 2005-511282 A, and JP 2006-525120 A.

Figure 6:
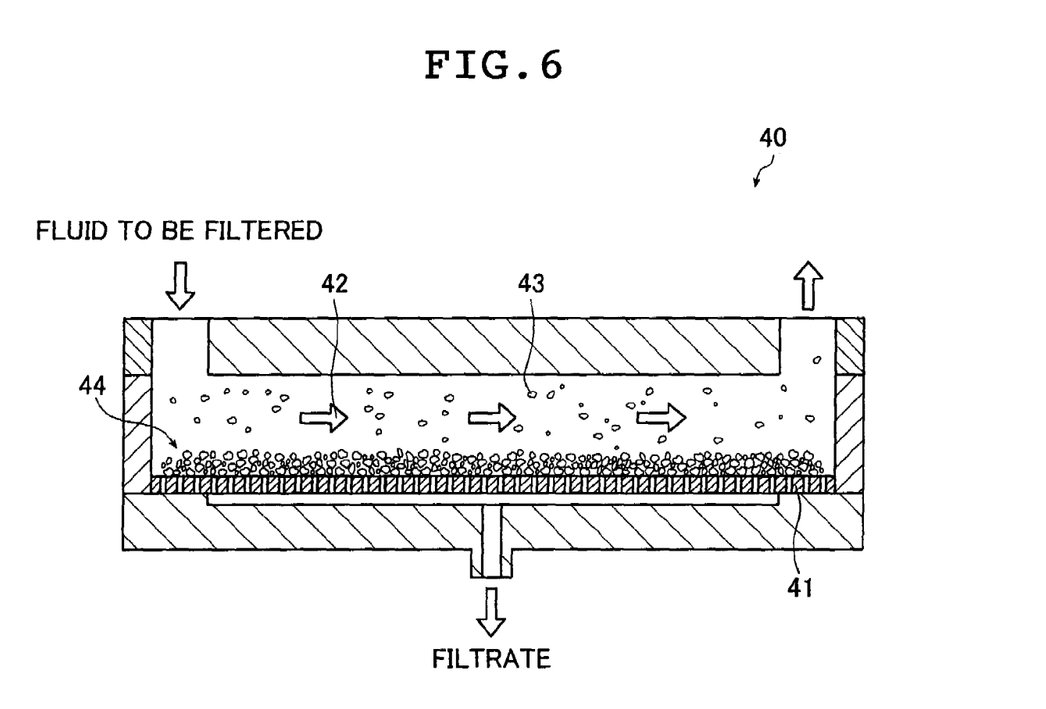
FIG. 6 is a schematic cross-sectional view illustrating an embodiment of the cross-flow filtration device of the invention.

The cross-flow filtration device of the invention is specifically described with reference to FIG. 6 which is a schematic cross-sectional view illustrating an embodiment of the cross-flow filtration device of the invention.

A cross-flow filtration device 40 according to the invention includes a membrane filter 41 for which the porous alumina membrane filter described above in detail is used. The cross-flow filtration device 40 feeds a fluid to be filtered in a direction indicated by an arrow 42 across the surface of the membrane filter 41 so that the flow of the fluid is parallel to the membrane surface, passes material 43 to be filtered with the membrane filter and recovers the filtrate.

The membrane filter used in the invention is the porous alumina membrane filter with micropores having a degree of ordering of at least 50% and a porosity of at least 40%, so the amount of filtration per membrane area and per unit time can be considerably improved as described above. This is presumably because material that does not pass through the membrane filter does not readily deposit on the membrane surface to prevent formation of the cake layer.

The invention uses for the membrane filter the porous alumina membrane filter with micropores whose pore size SD falls within 10% of the average pore size, so the filtration accuracy can also be improved as described above. This is presumably because the micropores formed are uniform in diameter to enable precise size fractionation of material to be filtered.

EXAMPLES

Examples are given below by way of illustration and should not be construed as limiting the invention.

Example 1

1. Preparation of Porous Alumina Membrane Filter
(1) Electrolytic Polishing

A high-purity aluminum substrate (Sumitomo Light Metal Industries, Ltd.; purity, 99.99 wt %; thickness, 0.4 mm) was cut to a diameter of 47 mm that allows it to be anodized, then subjected to electrolytic polishing treatment using an electrolytic polishing solution of the composition indicated below at a voltage of 25 V, a solution temperature of 65° C., and a solution flow velocity of 3.0 m/min.

A carbon electrode was used as the cathode, and a GP0110-30R unit (Takasago, Ltd.) was used as the power supply. In addition, the flow velocity of the electrolytic solution was measured using a vortex flow monitor FLM22-10PCW manufactured by As One Corporation.

Electrolytic Polishing Solution Composition:

| | |
|---|---|
| 85 wt % Phosphoric acid (Wako Pure Chemical Industries, Ltd.) | 660 mL |
| Pure water | 160 mL |
| Sulfuric acid | 150 mL |
| Ethylene glycol | 30 mL |

(2) Anodizing Treatment

The sample obtained after electrolytic polishing was subjected to 1 hour of anodizing treatment with an electrolytic solution of 0.30 mol/L sulfuric acid under the following conditions: voltage, 25 V; solution temperature, 15° C.; solution flow velocity, 3.0 m/min. After anodizing treatment, the sample was then subjected to film removal treatment which involved immersing it for 20 minutes in an aqueous solution (solution temperature, 40° C.) of 0.5 mol/L phosphoric acid. The conditions of the anodizing treatment for the electrolytic solution, voltage and solution temperature are shown in Table 1.

These treatments were repeated in this order four times, after which the sample was subjected to 5 hours of re-anodizing treatment with an electrolytic solution of 0.30 mol/L sulfuric acid under the following conditions: voltage, 25 V; solution temperature, 15° C.; solution flow velocity, 3.0 m/min, then to film removal treatment involving immersion in an aqueous solution of 0.5 mol/L phosphoric acid at 40° C. for 20 minutes, thus forming, on the surface of the aluminum substrate 12, the anodized film 14 having the micropores 16 of a straight tube shape arranged in a honeycomb pattern (see FIGS. 2D and 3).

Anodizing treatment and re-anodizing treatment were both carried out using a stainless steel electrode as the cathode and using a GP0110-30R unit (Takasago, Ltd.) as the power supply. In addition, use was made of NeoCool BD36 (Yamato Scientific Co., Ltd.) as the cooling system, and Pairstirrer PS-100 (Tokyo Rikakikai Co., Ltd.) as the stirring and warming unit. The flow velocity of the electrolytic solution was measured using the vortex flow monitor FLM22-10PCW (As One Corporation).

(3) Separation Treatment

The sample obtained after anodizing treatment was immersed in a mixed aqueous solution containing 20 wt % hydrochloric acid and 0.1 mol/L cupric chloride at 25° C. for 20 minutes to dissolve and remove the aluminum substrate 12 to thereby prepare a microstructure in which the anodized film 14 had the micropores 16 (see FIG. 4).

(4) Perforating Treatment

The thus obtained microstructure was immersed in an aqueous solution of 0.10 mol/L potassium chloride at 25° C. for 2 minutes, then the side to be perforated was brought into contact with 0.10 mol/L potassium hydroxide at 20° C. for 10 minutes to prepare a microstructure in which the anodized film 14 had the through micropores 18 (see FIG. 5).

(5) Heating Treatment

The microstructure obtained above was subjected to heating treatment at a temperature of 400° C. for 1 hour to obtain a porous alumina membrane filter.

2. Shape Analysis of Porous Alumina Membrane Filter

A surface image (magnification, 20,000×) of the resulting porous alumina membrane filter was taken by FE-SEM, and the average pore size and the pore size SD were calculated by the following formulas:

Average pore size: $\mu_x = (1/n)\Sigma Xi$

Pore size standard deviation:

$$\sigma = \sqrt{\frac{n\Sigma \mu_x^2 - (\Sigma \mu_x)^2}{n(n-1)}}$$

(wherein Xi represents the diameter of a micropore measured within an area of 1 μm²) for all the micropores present in a 1 μm×1 μm field and the opening ratio per unit area was determined. As a result, the average pore size was 38 nm, the standard deviation 2.7 nm and the ratio of the pore size SD to the average pore size 7.1%. The results are shown in Table 2.

The degree of ordering as defined by formula (1):

Degree of ordering (%)=$B/A$×100     (1)

(wherein A represents the total number of micropores in a measurement region, and B represents the number of specific micropores in the measurement region for which, when a circle is drawn so as to be centered on the center of gravity of a specific micropore and so as to be of the smallest radius that is internally tangent to the edge of another micropore, the circle includes the centers of gravity of six micropores other than the specific micropore) and the porosity as defined by formula (2):

$$\text{Porosity (\%)} = C/D \times 100 \qquad (2)$$

(wherein C represents the sum of opening areas of all the micropores in the measurement region; and D represents the area of the measurement region) were determined for all the micropores present in the measurement region of a 1 µm×1 µm field. As a result, a degree of ordering of 90% and a porosity of 72% were obtained. These results are shown in Table 2.

3. Filtration Treatment

Cross-flow filtration was carried out with the resulting porous alumina membrane filter.

To be more specific, the resulting porous alumina membrane filter was attached to a stirring type ultrafilter unit (UHP-43K produced by Toyo Roshi Kaisha, Ltd.), and a 1% aqueous solution of 100 nm polystyrene particles (standard particles: 3,100 particles/mL; produced by Tech-Jam Inc.) was used to measure the amount of filtration per membrane area and per unit time (L/cm$^2$h) at a suction pressure of 0.5 MPa. The result is shown in Table 2.

In order to evaluate the filtration accuracy of the filtration treatment, an aqueous solution of polystyrene particles with a particle size of 20 nm (3020A; NIST traceable) and an aqueous solution of polystyrene particles with a particle size of 60 nm (3060A; NIST traceable) were mixed at a ratio of 1:1 to prepare 50 cc of a mixed solution. The mixed solution was filtered through the resulting porous alumina membrane filter to measure the frequency of presence of the respective particles after filtration with a granulometer (LB-500; produced by Horiba, Ltd.) The results are shown in Table 2.

More accurate separation of particles with a particle size of 60 nm from those with a particle size of 20 nm indicates higher filtration accuracy.

Example 2

Example 1 was repeated except that an electrolytic solution of 0.50 mol/L oxalic acid was used for anodizing treatment and the voltage was 40 V, thereby obtaining a porous alumina membrane filter.

The resulting porous alumina membrane filter was subjected to shape analysis as in Example 1 and measurement of the amount of filtration per membrane area and per unit time. The results are shown in Table 2.

Example 3

Example 1 was repeated except that anodizing treatment and film removal treatment were repeated three times in this order before carrying out re-anodizing treatment, thereby obtaining a porous alumina membrane filter.

The resulting porous alumina membrane filter was subjected to shape analysis as in Example 1 and measurement of the amount of filtration per membrane area and per unit time. The results are shown in Table 2.

Example 4

Example 1 was repeated except that anodizing treatment and film removal treatment were repeated twice in this order before carrying out re-anodizing treatment, thereby obtaining a porous alumina membrane filter.

The resulting porous alumina membrane filter was subjected to shape analysis as in Example 1 and measurement of the amount of filtration per membrane area and per unit time. The results are shown in Table 2.

Example 5

Example 1 was repeated except that anodizing treatment and film removal treatment were performed once in this order before carrying out re-anodizing treatment, thereby obtaining a porous alumina membrane filter.

The resulting porous alumina membrane filter was subjected to shape analysis as in Example 1 and measurement of the amount of filtration per membrane area and per unit time. The results are shown in Table 2.

Example 6

Example 1 was repeated except that anodizing treatment was carried out at a voltage of 20V, thereby obtaining a porous alumina membrane filter.

The resulting porous alumina membrane filter was subjected to shape analysis as in Example 1 and measurement of the amount of filtration per membrane area and per unit time. The results are shown in Table 2.

Example 7

Example 1 was repeated except that anodizing treatment was carried out at a voltage of 23 V, thereby obtaining a porous alumina membrane filter.

The resulting porous alumina membrane filter was subjected to shape analysis as in Example 1 and measurement of the amount of filtration per membrane area and per unit time. The results are shown in Table 2.

Example 8

Example 1 was repeated except that anodizing treatment was carried out at a solution temperature of 10° C., thereby obtaining a porous alumina membrane filter.

The resulting porous alumina membrane filter was subjected to shape analysis as in Example 1 and measurement of the amount of filtration per membrane area and per unit time. The results are shown in Table 2.

Example 9

Example 1 was repeated except that anodizing treatment was carried out at a solution temperature of 5° C., thereby obtaining a porous alumina membrane filter.

The resulting porous alumina membrane filter was subjected to shape analysis as in Example 1 and measurement of the amount of filtration per membrane area and per unit time. The results are shown in Table 2.

Comparative Example 1

The porous alumina membrane filter obtained in Example 1 was used to carry out so-called dead-end filtration at a suction pressure of 0.5 MPa to measure the amount of filtration per membrane area and per unit time. The results are shown in Table 2.

Comparative Example 2

Cross-flow filtration at a suction pressure of 0.5 MPa was carried out as in Example 1 except that the porous alumina membrane filter was replaced by a microfilter (Anodisc; diameter: 47 mm; nominal average pore size: 0.02 μm; Whatman). The results are shown in Table 2.

The microfilter used was subjected to shape analysis as in Example 1 and the amount of filtration per membrane area and per unit time was measured. The results are shown in Table 2.

Comparative Example 3

Cross-flow filtration at a suction pressure of 0.5 MPa was carried out as in Example 1 except that the porous alumina membrane filter was replaced by a microfilter (Isopore; diameter: 47 mm; nominal average pore size: 0.02 μm; Whatman). The results are shown in Table 2.

The microfilter used was subjected to shape analysis as in Example 1 and the amount of filtration per membrane area and per unit time was measured. The results are shown in Table 2.

Comparative Example 4

Example 7 was repeated except that anodizing treatment and film removal treatment were performed once in this order before carrying out re-anodizing treatment, thereby obtaining a porous alumina membrane filter.

The resulting porous alumina membrane filter was subjected to shape analysis as in Example 1 and measurement of the amount of filtration per membrane area and per unit time. The results are shown in Table 2.

Comparative Example 5

Example 6 was repeated except that anodizing treatment and film removal treatment were performed once in this order before carrying out re-anodizing treatment, thereby obtaining a porous alumina membrane filter.

The resulting porous alumina membrane filter was subjected to shape analysis as in Example 1 and measurement of the amount of filtration per membrane area and per unit time. The results are shown in Table 2.

Comparative Example 6

Example 1 was repeated except that anodizing treatment was carried out at a voltage of 16 V and a solution temperature of 10° C., thereby obtaining a porous alumina membrane filter.

The resulting porous alumina membrane filter was subjected to shape analysis as in Example 1 and measurement of the amount of filtration per membrane area and per unit time. The results are shown in Table 2.

TABLE 1

| | Conditions of anodizing treatment | | | |
|---|---|---|---|---|
| | Electrolytic solution | Voltage (V) | Solution temperature (° C.) | Number of repetitions |
| Example 1 | 0.3 mol/L sulfuric acid | 25 | 15 | 4 |
| Example 2 | 0.5 mol/L oxalic acid | 40 | 15 | 4 |
| Example 3 | 0.3 mol/L sulfuric acid | 25 | 15 | 3 |
| Example 4 | 0.3 mol/L sulfuric acid | 25 | 15 | 2 |
| Example 5 | 0.3 mol/L sulfuric acid | 25 | 15 | 1 |
| Example 6 | 0.3 mol/L sulfuric acid | 20 | 15 | 4 |
| Example 7 | 0.3 mol/L sulfuric acid | 23 | 15 | 4 |
| Example 8 | 0.3 mol/L sulfuric acid | 25 | 10 | 4 |
| Example 9 | 0.3 mol/L sulfuric acid | 25 | 5 | 4 |
| Comparative Example 1 | 0.3 mol/L sulfuric acid | 25 | 15 | 4 |
| Comparative Example 2 | Anodisc (commercialized product) | | | |
| Comparative Example 3 | Isopore (commercialized product) | | | |
| Comparative Example 4 | 0.3 mol/L sulfuric acid | 23 | 15 | 1 |
| Comparative Example 5 | 0.3 mol/L sulfuric acid | 20 | 15 | 1 |
| Comparative Example 6 | 0.3 mol/L sulfuric acid | 16 | 10 | 4 |

TABLE 2

| | Average pore size (nm) | SD (nm) | Ratio of SD to average pore size (%) | Degree of ordering (%) | Porosity (%) | Filtration system | Filtration rate (L/cm$^2$h) | Frequency of presence of particles after filtration (%) 20 nm diameter | Frequency of presence of particles after filtration (%) 60 nm diameter |
|---|---|---|---|---|---|---|---|---|---|
| Example 1 | 38 | 2.7 | 7.1 | 90 | 72 | Cross-flow | 54 | 100 | 0 |
| Example 2 | 55 | 2.5 | 4.5 | 90 | 68 | Cross-flow | 53 | 100 | 0 |
| Example 3 | 37 | 2.5 | 6.8 | 86 | 65 | Cross-flow | 51 | 100 | 0 |
| Example 4 | 37 | 3.2 | 8.6 | 83 | 66 | Cross-flow | 51 | 100 | 0 |
| Example 5 | 37 | 3.3 | 9.0 | 80 | 62 | Cross-flow | 51 | 100 | 0 |
| Example 6 | 35 | 1.2 | 3.5 | 55 | 65 | Cross-flow | 51 | 100 | 0 |
| Example 7 | 36 | 1.4 | 4.0 | 72 | 67 | Cross-flow | 53 | 100 | 0 |
| Example 8 | 37 | 1.5 | 4.0 | 81 | 55 | Cross-flow | 48 | 100 | 0 |
| Example 9 | 37 | 1.5 | 4.0 | 82 | 45 | Cross-flow | 45 | 100 | 0 |
| Comparative Example 1 | 38 | 0.9 | 2.4 | 90 | 72 | Dead-end | 5 | 100 | 0 |
| Comparative Example 2 | 20 | 5.0 | 25.0 | 8 | 66 | Cross-flow | 18 | 65 | 35 |

TABLE 2-continued

|  | Average pore size (nm) | SD (nm) | Ratio of SD to average pore size (%) | Degree of ordering (%) | Porosity (%) | Filtration system | Filtration rate (L/cm²h) | Frequency of presence of particles after filtration (%) | |
|---|---|---|---|---|---|---|---|---|---|
|  |  |  |  |  |  |  |  | 20 nm diameter | 60 nm diameter |
| Comparative Example 3 | 20 | 1.0 | 5.0 | 0 | 9 | Cross-flow | 4 | 100 | 0 |
| Comparative Example 4 | 36 | 3.7 | 10.4 | 55 | 45 | Cross-flow | 42 | 67 | 33 |
| Comparative Example 5 | 35 | 2.8 | 8.0 | 47 | 46 | Cross-flow | 21 | 85 | 15 |
| Comparative Example 6 | 30 | 2.7 | 9.0 | 53 | 38 | Cross-flow | 27 | 80 | 20 |

Table 2 indicates that use of each of the porous alumina membrane filters (in Examples 1 to 9) whose degree of ordering, porosity and pore size SD are all within the predetermined ranges as the cross-flow membrane filter considerably improves the amount of filtration per membrane area and per unit time with higher filtration accuracy, as compared with the porous alumina membrane filters (in Comparative Examples 2 to 6) in which at least one of the degree of ordering, the porosity and the percentage of the pore size SD to the average pore size is outside the predetermined ranges.

What is claimed is:

1. A method of cross-flow filtration using a membrane filter, comprising:
    feeding a fluid to be filtered across a membrane surface of a porous alumina membrane filter serving as the membrane filter so that the fluid flows parallel to the membrane surface to separate material to be filtered with the porous alumina membrane filter,
    wherein the porous alumina membrane filter is made of an aluminum anodized film and includes micropores having a degree of ordering as defined by formula (1):

Degree of ordering (%)=$B/A$×100      (1)

(wherein A represents a total number of micropores in a measurement region, and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore) of at least 50%, a porosity as defined by formula (2):

Porosity (%)=$C/D$×100      (2)

(wherein C represents a sum of opening areas of all the micropores in the measurement region; and D represents an area of the measurement region) of at least 40%, and a percentage of a pore size standard deviation to an average pore size of up to 10%, and
    wherein the aluminum anodized film is obtained by anodizing treatment including the following operations (1) to (4) in this order:
    (1) subjecting a surface of an aluminum substrate to a first anodizing treatment to form a micropore-bearing anodized film on the surface of the aluminum substrate;
    (2) partially dissolving the anodized film using an aqueous solution comprising at least one selected from the group consisting of sulfuric acid, phosphoric acid, nitric acid, hydrochloric acid, sodium hydroxide, potassium hydroxide, and lithium hydroxide;
    (3) performing a second anodizing treatment to grow the micropores in a depth direction of the micropores; and
    (4) removing a part of the anodized film above inflection points in cross section of the micropores.

* * * * *